(No Model.)

L. M. HOLT & C. N. EARL.
IRRIGATING AND DRAINING LAND.

No. 302,488. Patented July 22, 1884.

Witnesses
Jas. R. Townsend.
W. R. S. O'Melveny

Inventors.
C. N. Earl
L. M. Holt

UNITED STATES PATENT OFFICE.

LUTHER M. HOLT, OF RIVERSIDE, AND CHARLES N. EARL, OF LOS ANGELES, CALIFORNIA.

IRRIGATING AND DRAINING LAND.

SPECIFICATION forming part of Letters Patent No. 302,488, dated July 22, 1884.

Application filed May 23, 1883. (No model.)

*To all whom it may concern:*

Be it known that we, LUTHER M. HOLT and CHARLES N. EARL, citizens of the United States, and residents, respectively, of the town of Riverside, in the county of San Bernardino, State of California, and of the city and county of Los Angeles, in said State, have invented a new and useful Improvement in Irrigating Devices, of which the following is a specification.

When land is irrigated by applying the water to the surface of the soil, a large proportion of the water is wasted through evaporation, and unless the surface of the soil is cultivated before it becomes dry a hard crust is usually formed, which retards the growth of vegetation. To avoid these objections various devices have been invented for the purpose of applying the water beneath the surface of the soil. Among these may be mentioned two which accomplish this in a measure effectually. In one the water is conducted in a pipe having nozzles or tubes extending upward from the top thereof and being surrounded by guards to protect them from the earth. By this means, when a sufficient head of water is turned into the pipe to raise the water to the top of the nozzle, it will overflow and pass out into the earth around the bottom of the guard. In the second device the joints of the pipe are connected by a coupling having an annular chamber and a series of lateral or horizontal outlets, through which the water may pass.

The object of our invention is to avoid the difficulties above stated and to distribute the water below the surface of the soil without loss, and to provide such means as to accomplish this with the expenditure of but little time or attention. This we do by means of the device described herein, and illustrated in the accompanying drawings.

Figure 1:
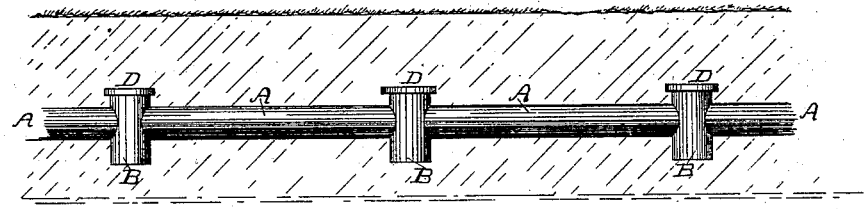
Figure 2:
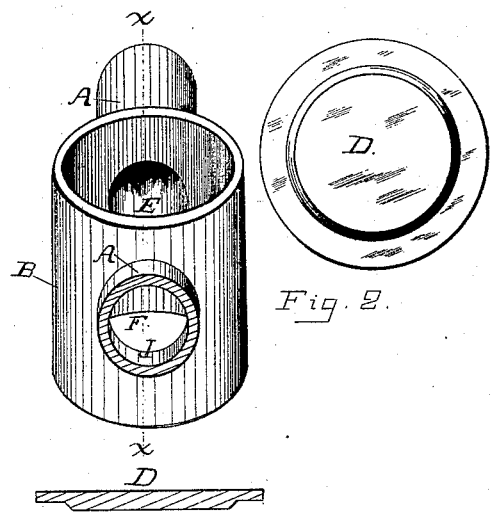
Figure 3:
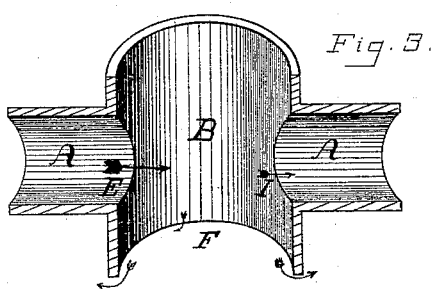

Figure 1 represents a pipe provided with our device as it would appear when in position if the earth were removed to expose it. Fig. 2 is a perspective view of our invention. Fig. 3 is a perspective section of the same on line *x x*.

The conduit A opens at intervals into upright cylinders B, having a diameter equal to or greater than that of the pipe, and extending above and below the pipe. These cylinders are open at each end and a cover, D, is provided to fit upon the upper end and prevent the earth from falling into the cylinder. The pipe and cylinder may be made of any suitable material and should be placed far enough below the surface of the earth to be out of the way of the plow. The extent of cylinder above the pipe is not material, the only object being to provide a suitable seat for the cap D, and to prevent the overflow of water when the pipe is full; but the cylinder should extend far enough below the pipe to form, in connection with the earth upon which it rests, a reservoir to receive a portion of the water passing through the pipe. When the water is turned into the pipe, it flows into the cylinder B through the inlet E, and, being retained by the earth upon which the cylinder rests, fills the part of the cylinder which is below the pipe, and then flows out through the outlet I and on through the pipe to the next reservoir, and so on to the end of the pipe. As the cylinder is open at the bottom F, the water in it is free to seep through the earth upon which the cylinder rests and be absorbed by the surrounding soil. The amount of water which will pass out will depend upon the character of the earth at the bottom of the cylinder, and may be diminished by paving the same with rocks or gravel if the soil is too porous. When the water is turned off from the pipe, all that remains therein will finally flow into the reservoirs formed by the lower part of the cylinders, and will be absorbed without loss. But little care is necessary to operate a system of pipes provided with our improvement, for when the water is turned into the pipes it will flow out through the bottom F of the reservoir until it is turned off, or until the reservoir should become clogged. It is well to extend the cylinder six or eight inches below the bottom of the pipe, so that a considerable amount of sediment may collect without destroying its effectiveness. As all the water in the pipe finally flows into the cylinders and becomes absorbed, the amount of sediment settling in the pipe is slight, nearly all the foreign matter in the water finding its way to the cylinders. When these become filled with sediment, which is not liable to occur oftener than once in five or six years, unless muddy water is passed through the pipes, the earth above the top of the cylinder can be removed and ready access to the inside of the cylinder and pipe attained by removing the cap D.

It is not necessary to the proper operation of this device that the upright portion B should be a cylinder, but we believe that to be the most desirable form.

Now, having described our invention, what we claim as new, and desire to secure by Letters Patent, is—

1. An irrigating device consisting of an upright cylinder, B, having an induct and an educt pipe, and extending below such pipes to form, in connection with the earth upon which it rests, a reservoir, such cylinder being open at its lower end, substantially as and for the purpose shown and described.

2. An irrigating device, consisting of an upright open cylinder, B, having an induct and an educt pipe, and extending below the bottom of such pipes, and being provided with a cover, D, substantially as shown and described.

3. An irrigating device consisting of a conduit, A, opening into an upright cylinder, B, such cylinder extending above and below the conduit and being provided with a cap or cover, D, all substantially as shown and described.

LUTHER M. HOLT.
CHARLES N. EARL.

Witnesses:
H. T. HAZARD,
JAS. R. TOWNSEND.